United States Patent [19]

Sterner et al.

[11] Patent Number: 4,463,022

[45] Date of Patent: Jul. 31, 1984

[54] METHOD OF GRINDING AND COOKING WHOLE GRAIN

[76] Inventors: Mark H. Sterner, 11661 Capitol St., Riverside, Calif. 92503; Ronald O. Zane, 5533 Wentworth Dr., Riverside, Calif. 92505

[21] Appl. No.: 321,907

[22] Filed: Nov. 16, 1981

Related U.S. Application Data

[63] Continuation-in-part of Ser. No. 123,977, Feb. 25, 1980, abandoned.

[51] Int. Cl.³ .................. B02B 17/00; A23P 1/00; A23L 1/27
[52] U.S. Cl. .................. 426/262; 99/353; 241/65; 426/473; 426/518; 426/523
[58] Field of Search .............. 426/473, 518, 523, 622, 426/464, 262, 448; 241/67, 293, 294; 99/617, 353

[56] References Cited

U.S. PATENT DOCUMENTS

| | | | |
|---|---|---|---|
| 2,120,138 | 6/1938 | Mathews et al. | 426/448 |
| 2,456,073 | 12/1948 | Newhouse | 241/67 |
| 2,477,627 | 8/1949 | Lanter | 241/69 |
| 2,587,372 | 2/1952 | Oliver | 241/98 |
| 2,873,663 | 2/1959 | Hawk et al. | 241/65 |
| 3,491,958 | 1/1970 | Zucchini | 241/67 |
| 3,983,261 | 9/1976 | Mendoza | 426/473 |

*Primary Examiner*—George Yeung
*Attorney, Agent, or Firm*—Fraser and Bogucki

[57] ABSTRACT

A method and apparatus are disclosed for treating a grain by crushing under controlled conditions of humidity, temperature, and quality of impact. The process is particularly adapted for making instant tortilla flour (masa harina) from a mixture of corn and lime and can be conducted continuously. In a preferred embodiment, grain with added lime is fed in a grinding chamber and ground therein to a fine powder by action of breaker bars which crush the grain against breaker plates mounted along the circumference of a grinding chamber cage. During grinding the grain product are subjected to a steam atmosphere generated from the grain moisture content, frictional heat and applied heat. The steam atmosphere is maintained by blocking the ingress of air while feeding in grain and extracting flour, and a cooked dry flour product is obtained. Various parameters of operation are controllable, resulting in energy savings, avoiding generation of waste water, drying of the product, and processing losses, while also shortening total processing time.

19 Claims, 6 Drawing Figures

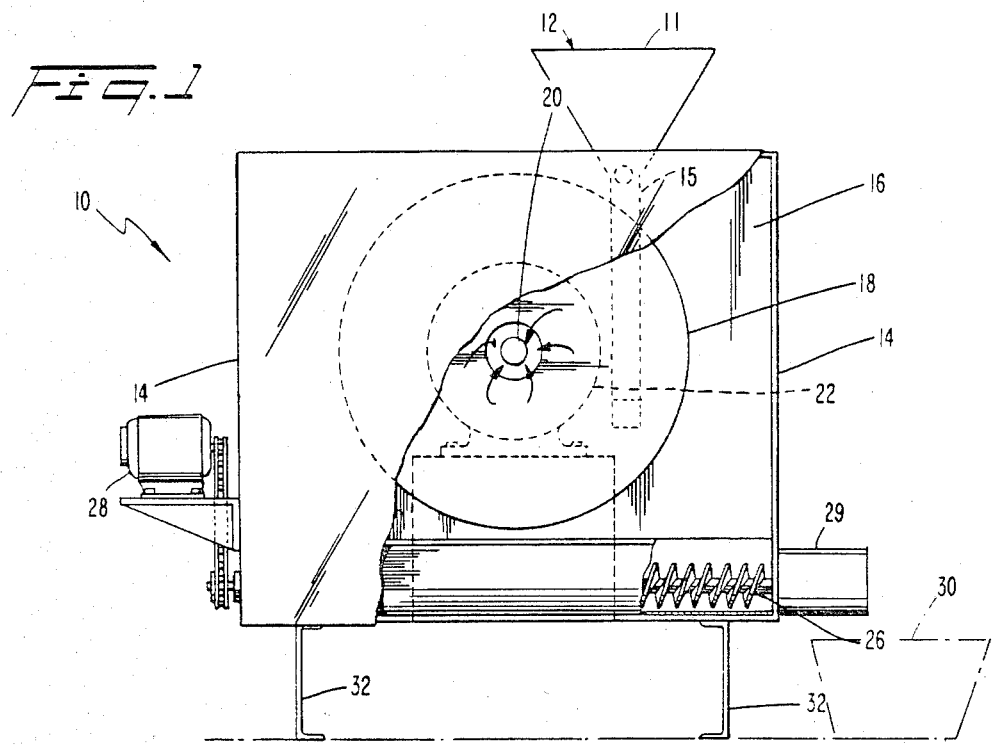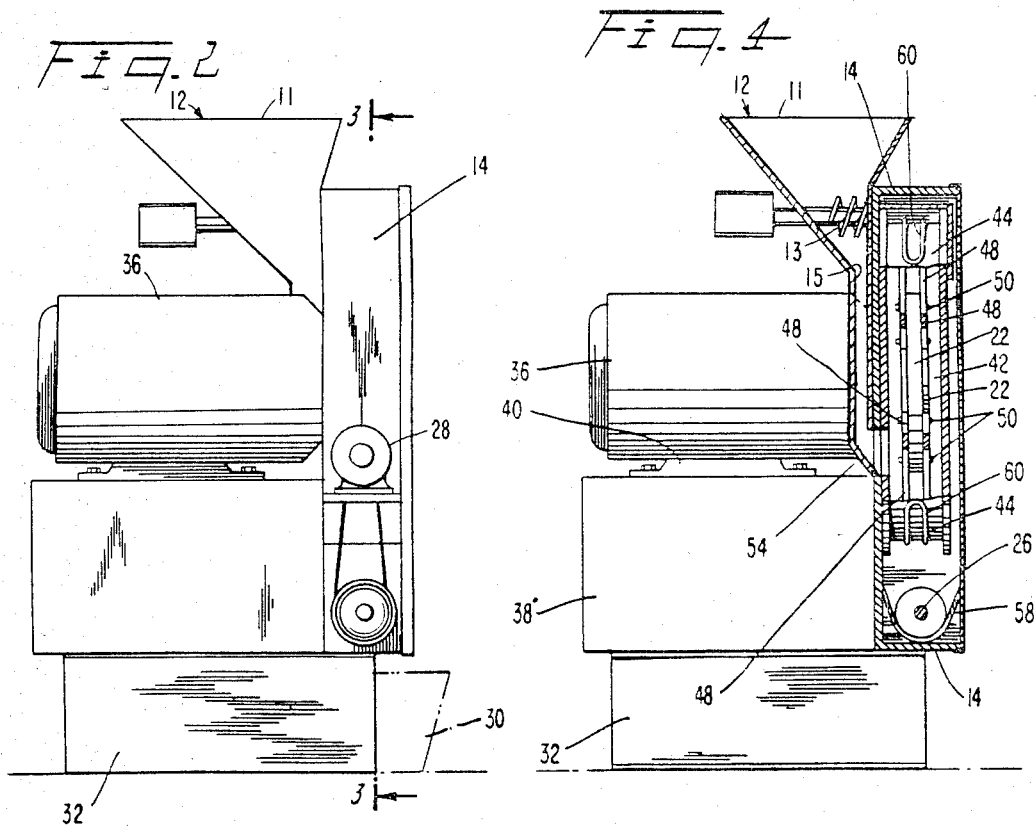

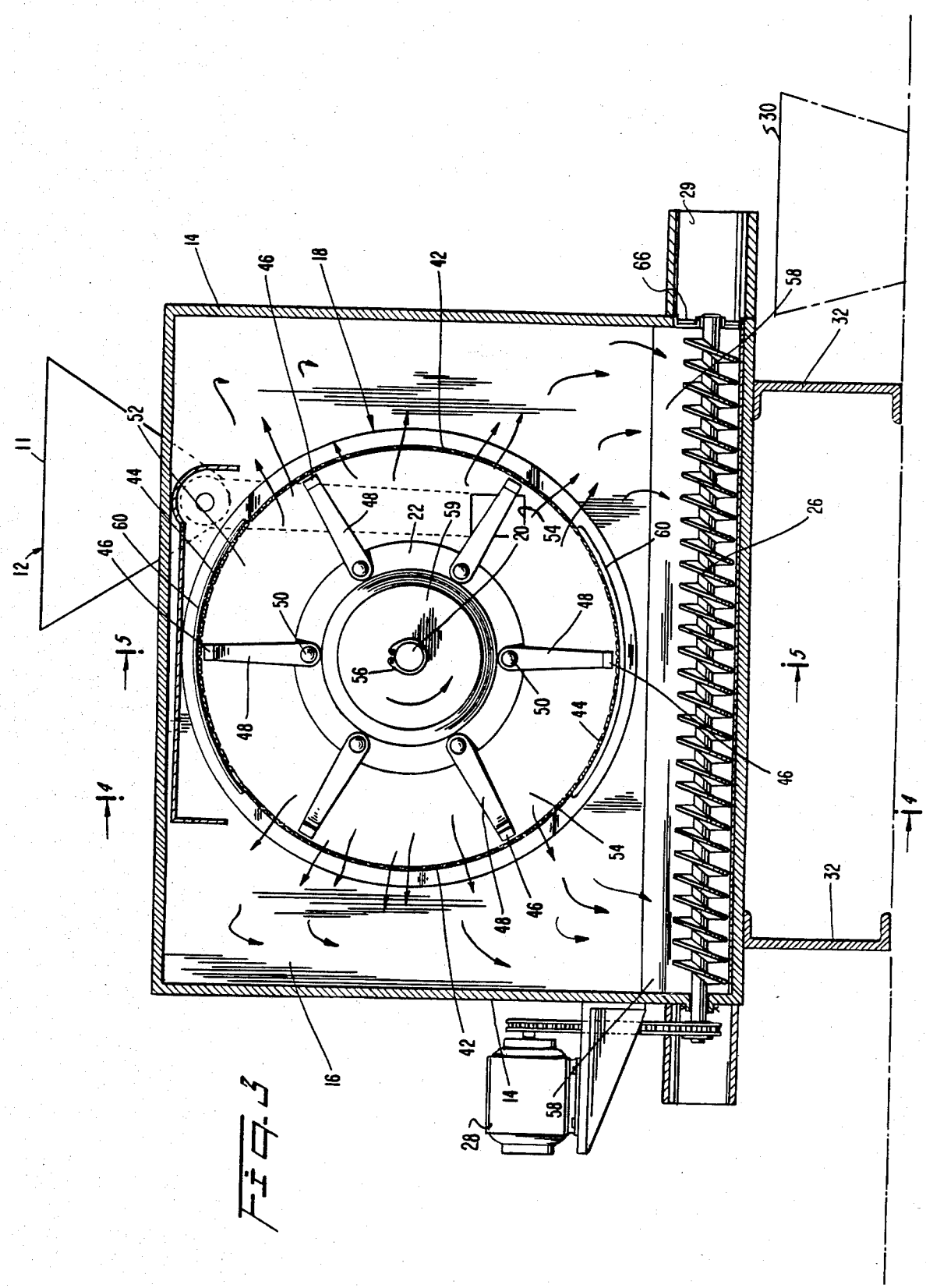

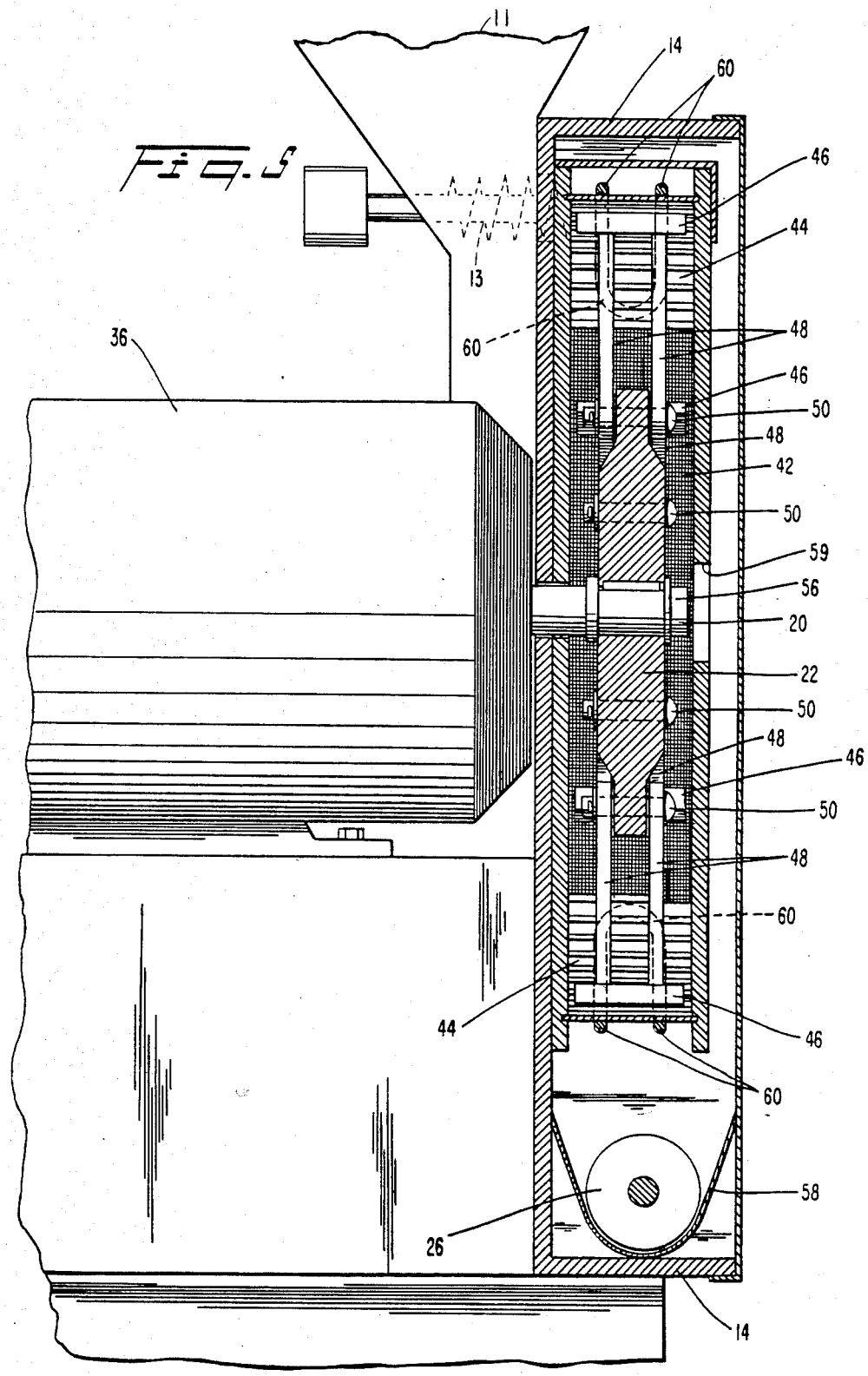

METHOD OF GRINDING AND COOKING WHOLE GRAIN

This is a continuation-in-part application of application Ser. No. 123,977, filed Feb. 25, 1980 now abandoned.

BACKGROUND OF THE INVENTION

1. Field of the Invention

The invention relates to cooking equipment and methods. More particularly, the invention concerns processing of grain, especially corn, for milling into a cohesive product suitable for forming a basic food product such as masa harina, which is a traditional corn flour used in preparing dough (masa) for making tortillas and the like. For domestic cooking, as well as certain commercial uses, it is desirable to provide a dry flour which with added water produces a dough of proper consistency and handling qualities. Lime is usually added for organoleptic purposes to give a final product which produces the proper taste and color.

2. History of the Prior Art

Corn is a staple food in Mexico and tortillas constitute the principal form in which corn is consumed in that country. The masa for tortillas is made by following a traditional cooking method involving hydrated lime (calcium hydroxide) heat treatment in which alkaline hydrolysis results by boiling corn grain in an aqueous solution. In the traditional procedure, corn is boiled for about twenty minutes in the lime solution, the mixture is allowed to stand overnight, the supernatant is decanted and the product is thoroughly rinsed with water. The wet corn product is then stone ground, giving the resulting masa product used to make tortillas. Optionally, for the convenience of a domestic user or for some commercial users, it is desirable to provide the dry flour, or instant tortilla flour, that is called masa harina. Certain known processes for making masa harina include U.S. Pat. No. 826,983, patented July 24, 1906 by Wreford et al, disclosing steeping corn in the traditional manner, followed by drying the kernels and grinding into flour. Erosa et al, in U.S. Pat. No. 987,560, patented Mar. 21, 1911, teach a process for partially boiling corn in calcium hydroxide solution and then grinding the wet kernels into paste. Water is pressed from the paste, followed by drying of press cake in a heated chamber, followed in turn by grinding into flour. A similar process is disclosed by Villegas in U.S. Pat. No. 1,262,144, patented Apr. 9, 1918, where the amount of lime in water is one-half per cent, and Garza in U.S. Pat. No. 1,334,366, issued Mar. 23, 1920, calls for molding of dough into small thin cakes which are dried and then ground into flour. A similar process is described by Lloyd in Pat. No. 2,584,893, issued Feb. 5, 1952.

Diez de Sollano et al in U.S. Pat. Nos. 2,704,257, issued Mar. 15, 1955; 2,854,339, issued Sept. 30, 1958; and 2,930,699, issued Mar. 29, 1960 disclose steeping of corn in calcium hydroxide solution at a temperature well below the gelatinization point of starch of the corn, followed by drying of the whole steeped corn in a hot airstream while simultaneously comminuting it to obtain a flour which has been dried at temperatures less than 74° C. to a moisture content of not more than 10% by weight. The patents also describe apparatus for use in the drying and grinding steps.

The presence of lime (which is added before grinding), is more adverse in the prior art, because the lime reacts with the corn and dissolves some of it. The practice in the prior art is to use somewhat more lime than necessary, then seep off or rinse the wet product to remove the excess lime, which also removes the corn that was dissolved in the lime. As much as 5% loss can arise from this reason.

Other patents of interest for showing processes for treating grains include the following:

| U.S. Pat. No. | Patentee |
|---|---|
| 3,117,868 | Madrazo et al |
| 242,588 | Boon |
| 1,018,595 | Villegas |
| 1,061,933 | Willford |
| 1,221,636 | Von Hagen |
| 1,265,700 | Von Hagen |
| 1,268,860 | De Lara |
| 1,586,869 | Wesener |
| 2,585,978 | Van Atta |

Each of the processes described in these patents, however, require for making an instant flour, such as masa harina for preparing tortillas, that the corn or other grain be first boiled or steeped, such as in an alkaline solution, with subsequent removal of water absorbed into the grain so that a stable flour can be made having proper doughing characteristics when reconstituted by addition of water. Accordingly, these methods suffer from the disadvantage of cost involved in boiling and removing water, both in terms of time expended and fuel consumed. With rapidly escalating fuel costs and the need for energy conservation, such processes are falling increasingly into disfavor. Moreover, discarding excess water after boiling of the grain can constitute an environmental problem, with most states in the United States now requiring such water to be specially treated due to its biochemical oxygen demand.

Of interest to the general subjects only of drying apparatus and hammer mill devices are the following patents:

| U.S. Pat. No. | Patentee |
|---|---|
| 2,535,570 | Gordon |
| 2,509,418 | Brown |
| 2,152,367 | Smith |
| 233,341 | Gaines |
| 1,244,774 | Pointe |
| 2,587,372 | Oliver |
| 3,761,024 | Schwey et al |
| 2,873,663 | Hawk et al |
| 2,477,627 | Lanter |

Mendoza, in U.S. Pat. No. 3,983,261, patented Sept. 28, 1976, discloses a method of milling grain while simultaneously cooking the grain with apparatus employing a coaxial conical rotor and stator between which the grain is crushed into a kind of paste. Heat is applied which decreases the relative humidity and the process is disadvantageous in providing an inconvenient form of final product and requiring further drying to produce an instant type flour. The paste is about 40% water, which is then dried to a low level and the product is reground to obtain the desired flour.

It is accordingly a principal object of the invention to provide a method and apparatus for continuously processing grain into a dry flour suitable for preparing foodstuffs upon the addition of water.

Another object is to provide a process for treating grain by crushing the grain and thereby generating heat autogenously, separating the comminuted grain produced thereby under conditions of moist heat, and removing the flour for storage and later use.

Still another object is to provide a process for treating corn to provide a corn flour with a moisture content of between about 5% and 12% which needs no separate drying step These objects, together with other objects and advantages which will become subsequently apparent, reside in the details of construction and operation as more fully hereinafter described and claimed. In the accompanying drawings forming a part hereof, like numerals refer to like parts throughout.

SUMMARY OF THE INVENTION

There is provided according to the invention a method of preparing a milled flowable granular cooked grain or corn product on a continuous basis without the need for the addition of water or the use of a drying step comprising the steps of:

feeding the corn kernels into an interior grinding chamber maintained at a temperature in the range of 200° to 400° F. without permitting the ingress of air;

circulating air through the grinding chamber within an exterior sealed chamber maintained at a temperature in the range of 180° F. to 300° F. to remove moisture from the ground corn during grinding in a closed cycle circulation until a steam atmosphere is established in the grinding chamber and the incoming corn and ground corn of desired fineness are stabilized at substantially like moisture contents in the range of 5 to 15%;

grinding the corn in the grinding chamber to a desired fineness and for an interval sufficient to cook the corn at the established temperature and fineness relationship; and withdrawing the cooked ground corn without substantially introducing unheated or dry air into the chambers.

A preferred apparatus for carrying out the above process for grinding and cooking of whole grain is provided, wherein at least a portion of the heat for cooking the grain is generatable autogenously, the apparatus comprising an enclosed outer chamber and a grinding chamber contained within the outer chamber, the grinding chamber having feed means for introducing whole grain into the grinding chamber, the grinding chamber being separated from the outer chamber by screen means for emission of crushed grain and air from the grinding chamber to the outer chamber, the outer chamber having conveying means for removal of said ground grain in an air-tight manner, the grinding chamber being provided with grinding means for crushing of the whole grain by impact within the grinding chamber, the grinding chamber further having an air inlet for recirculation of air from the outer chamber into the grinding chamber, whereby whole grain is continuorsly crushed and cooked to produce said crushed grain flour.

According to the invention process, an essential feature and the key to fast cooking is the creation of a steam atmosphere in the intergrinding portion of the system. Such steam atmosphere is produced in one example by recirculation of the airstream through the grinding or impact chamber where the energy input of the grinding means, e.g. in the form of breaker bars, crushing the corn against breaker plates, is transformed into heat and the natural moisture of the corn is released into the airstream. In conventional known grinding methods, the airstream with its relatively low moisture content is vented to the atmosphere immediately after it leaves the grinding chamber. However, according to applicants' process, the heated and moisture laden airstream is recirculated through the grinding or impact chamber where it picks up even more moisture from the incoming corn stream and added heat from an additional heat source, preferably employed adjacent the screen means. This accumulation of moisture and heat continues within the outer chamber and the grinding or impact chamber until the airstream becomes a steam atmosphere. Such atmosphere is maintained in preferred practice of the invention process by controlling the temperature using additional heating means such as electrical resistance heating rods. It is the accumulated moisture in the presence of adiabatic and applied heat which gelatinizes the starches in the flour or corn particles in a manner best suited to provide the dough-making properties desired for masa harina. The cooking of the corn thus takes place as the distributed particles of corn and flour pass through a continuous process within the apparatus, and no further additional drying of the cooked corn is required. The dwell time and internal temperatures may readily be adjusted to vary the characteristics of the final product.

If desired, the moisture level in the enclosure formed by the outer chamber and the grinding chamber can be increased by injecting steam and venting out of the top of this machine or the grain may be preconditioned by the addition of moisture prior to grinding.

BRIEF DESCRIPTION OF THE DRAWINGS

A better understanding of the invention may be had from a consideration of the following detailed description taken in conjunction with the accompanying drawings, in which:

FIG. 1 is an end elevational view of the apparatus of the present invention, partly broken away to show details of the grinding chamber, and partly further broken away to show details of a conveyor for removing of final product;

FIG. 2 is a side elevational view of the apparatus in FIG. 1, viewed along the direction of the conveyor;

FIG. 3 is an end sectional view of the apparatus of FIG. 2, taken substantially upon a plane passing along section line 3—3 on FIG. 2, and showing details of the grinding chamber and associated cage;

FIG. 4 is a sectional view of the apparatus of FIG. 3, taken substantially upon a plane passing along section line 4—4 on FIG. 3 and showing the grinding chamber partly broken away;

FIG. 5 is an enlarged sectional view of the apparatus of FIG. 3, taken substantially upon a plane passing along section line 5—5 passing through the axis of the grinding chamber, showing details thereof and its association with the driving motor.

DETAILED DESCRIPTION OF THE INVENTION

Figure 6:
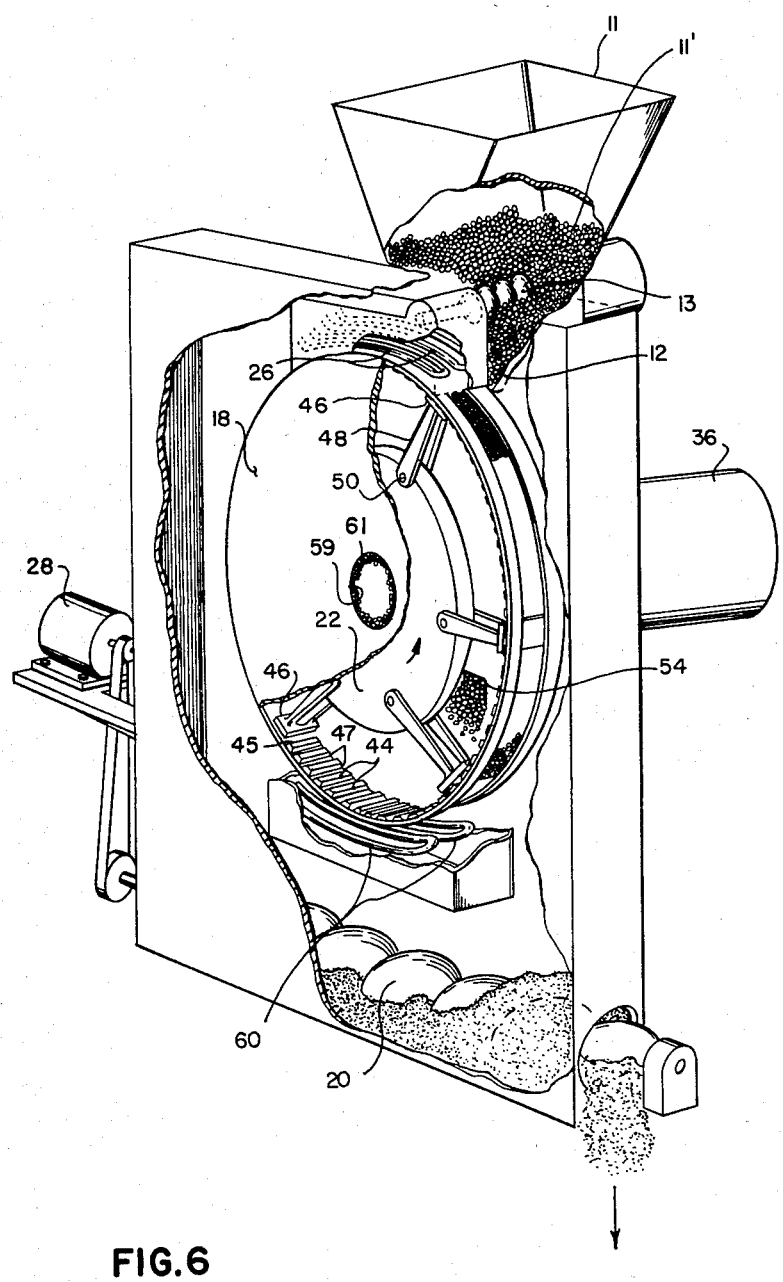
FIG. 6 is a perspective partially broken away view of the apparatus of the invention.

The process of the present invention reduces the cost of making instant tortilla flour (masa harina) and other grain flours by avoiding prior boiling or steeping of grain, and by avoiding separate drying and regrinding steps. In order to provide a continuous process utilizing only one milling in a compact unit, and still provide a desirable degree of treatment of grain which is neither undercooked nor overcooked, the apparatus of the present invention produces a product with desirable properties which avoids problems inherent in processes and apparatus of the prior art.

The grain may be preconditioned if desired, as by initially treating the grain either with heat or moisture so as to make processing more uniform and to reduce the processing time. Then grain may be heated externally or internally, particularly if the ambient temperature is low. If the corn has been stored for an extended period, it may be dry so that the addition of some water may be desirable. The grain or corn can also be preconditioned to adapt it to personal preference in color and odor. Thus when one wants a yellower color and slightly more astringent odor in the final process, the grinding process of the invention is used but the corn may be subjected to a preconditioning step which consists of preparing a slurry of water and calcium hydroxide with only sufficient water to dissolve the calcium hydroxide so that it wets the corn and provides a light coating on the surface of the corn. The coating is obtained by tumbling the corn and the corn is fixed by running through live steam as the corn is being tumbled for about three minutes. The corn is then dried at about 150° F. for about one hour. Then it is ready for grinding according to the invention as described below. However, such preconditioning steps are only optional and are much dependent on personal preferences as to color and taste.

Referring to FIGS. 1 and 5, the grinding device of the present invention is represented generally by the numeral 10, including infeed 12, where grain such as corn along with pregrinding additives, such as calcium hydroxide for organoleptic purposes, is introduced into grinder 10. Chamber housing 14 forms outer chamber 16, the inside of which is defined by a cage 18 for the interior grinder. As seen in FIG. 5, infeed 12 includes a hopper 11. Grain at 11' is placed in the hopper 11 on the top, and an auger 13 distributes the grain to the feed chute 15 of infeed 12 (see also FIG. 4), the grain moving by gravity down into and through the interior of outer chamber 16 into the cage 18 in which grinding takes place. The grain in chute 15 forms an air seal for the interior of outer chamber 16. Arrows inside cage 18 indicate the direction of flow of air between impeller shaft 20 and impeller wheel 22. Screw conveyor 26 is operated through a chain drive by conveyor motor 28, and conveys the final product in a rightward direction in FIG. 1, discharging the ground product from discharge end 29 into receptacle 30. Mounting beams 32 support the entire device.

Referring to FIG. 2, infeed 12 can be seen positioned behind chamber housing 14, as well as impeller motor 36. Motor 36 is mounted on mounting base 38 by motor support 40.

In FIGS. 3, 5 and 6, internal details of cage 18 and components therein are shown. Arrows indicate the direction of air flow and of emitted grain particles passing through screens 42 after crushing of grain particles on breaker plates 44 upon impact by breaker bars 46, each of which is mounted on a stirrup pin 50 by which stirrup 48 is mounted on impeller wheel 22. There are top and bottom breaker plate sections 44 separated by two perforated screens 42 circumferentially spaced from the impeller wheel 22. Accordingly, the space between impeller wheel 22 and the circumference defined by screens 42 and breaker plates 44 defines the mechanically operative part of grinding chamber 52. Grain is introduced from inlet chute 15 into grinding chamber 52 through grinding chamber inlet 54, which receives grain through infeed 12. The interior volume of the grinding chamber provides substantially free flow paths for air and steam to distributed corn and flour particles that are dispersed in the grinding operation about the periphery of the cage 18.

In operation, impeller wheel 22 rotates preferably in a counterclockwise direction as seen in these Figures so that stirrups 48 coupled to the impeller wheel 22 by stirrup pins 50 carry terminal breaker bars 46 in paths moving closely adjacent to respective breaker plates 44. Grain and partially ground flour is caught between the breaker bars 46 and plates 44 to provide a crushing or impacting action therebetween that quickly reduces the flour particles to sizes that will pass through the screens 42.

As best seen in FIG. 6, the breaker bars or hammers 46 are rotated in a direction to encounter first the right angle edges 45 of breaker plates 44, which have a flat intermediate surface and then a tapered trailing edge surface 49. This feature is important in obtaining the high grinding speed and temperature that is required. Impeller wheel 22 is retained on impeller shaft 20 by retaining ring 56.

Air and moisture enters grinding chamber 52 in a generally axial direction by recirculation from outer chamber 16, entering through side inlet 59 closely surrounding impeller shaft 20, and a relatively high velocity airstream exits in the direction of the arrows through the edge screens 42 carrying pulverized and heated grain particles of sufficiently small size into chamber 16. This ground flour then settles into conveyor trough 58 for movement rightwardly (FIGS. 1, 4 and 6) by screw conveyor 26 to be discharged through discharge end 29 into receptacle 30. If desired, a closed conveyor tube under suction (not shown) can be employed for this purpose. The air and moisture emitted from the grinding chamber 52 then recirculates within the outer chamber 16 through the perforated disk 61 in the inlet 59 back into the grinding chamber 52. In order to provide auxiliary heating if needed or desired, resistive heating elements 60 are provided adjacent the breaker plates 44. These elements 60 can raise the temperature of breaker plates 44 in order to supplement heat autogenously generated by the impacting process, to develop heat in excess of a minimum cooking temperature. Cooking takes place during continual passage of hot moist air over and about the distributed material during grinding.

The primary function of the cooking step which occurs essentially during the crushing or impacting of the grain in the grinding chamber 52 is to gelatinize the starches in the grain. The woman who makes tortillas by hand generally prefers a greater degree of gelatinization because when she adds water to the flour, she is able to shape the tortilla more easily. The apparatus of the present invention is adapted to vary the conditions of operation so as to provide control of such gelatinization. For this purpose temperature is more significant than is the residence time in the grinding chamber. After the corn enters the system via the inlet hopper, it is quickly ground down in the grinding chamber by the rotating breaker bars and passes out the sizing screen through the outlet auger or conveyor 26. The residence time of the corn in the grinding chamber is determined by the speed of the rotating breaker bars 46 and the opposing surfaces of breaker plates 44, and also the temperature. For example, rotor speed of impeller wheel 22 can be 3600 rpm, with a 24" radius. The hammers or breaker bars 46 can be spaced ⅛ from the breaker plates 44. Some care should be exercised in cooking, since the ground grain will burn if ground for too long a time, and affect not only the taste but also the doughability of the product.

As previously noted, the corn is ground in the presence of a steam atmosphere. The more finely ground the product, the quicker the heat penetrates and cooks the grain product. Some further cooking takes place in the outer chamber 52. An essential feature of the invention is the ability to cook the grain in the presence of a steam atmosphere (which will usually but not necessarily be superheated), without the addition of excess water that must be later removed, and using a low-moisture content grain, as further noted below. Thus, the grinder-cooker apparatus of the invention can be coupled in line with a masa machine so as to feed the cooked grain product directly from the grinder-cooker to the masa machine, with the dough being formed merely by adding some water to the cooked grain and mixing the product in the masa machine.

Grain can be continuously introduced through infeed 12, thereby avoiding the separate steps and controls necessary in a batch type process in which grain is steeped, removed and subjected to subsequent drying steps. Moreover, the energy consumed in preparation of the final product according to the present invention is considerably less than that required in a steeping process, amounting to approximately 0.082 British Thermal Units (BTUs) per pound of initial product. By comparison, a steeping process, requiring a process time of from approximately four to twelve hours, typically requires a minimum of 0.123 BTUs per pound of product. This energy is required to reduce moisture content from 35–40% down to the 10–15% range. No separate drying step is needed in the process of the present invention, since there is no water addition to the grain during processing. As a further consequence, the traditional process produces a considerable amount of waste water having a high biochemical oxygen demand, and therefore presents a substantial environmental problem requiring costly treatment before discarding. In addition, only a single milling is required by contrast with prior processes in which the product must be ground twice.

While prior processes require a cooking time of 20 to 24 minutes, in addition to the lengthy processing time of about 4 to 12 tours, with the method of the present invention, a maximum of a few minutes can reasonably be expected from the time of introduction of raw material to packaging of a substantial amount of the final product. Typical residence times are only of the order of a few seconds from entry into the grinding chamber, once flows are stabilized. Furthermore, no processing loss of grain occurs with the method of the present invention, while experience has shown that from about 10–15% of corn is lost due to dissolving of a portion of the grain endosperm and pericarp. The presence of lime causes some dissolution of the surface of the grain and when excess acounts of water and lime are employed, as in prior art methods, this loss can be considerable. With the apparatus of the present invention, a highly compact unit can be used in practicing the process of the invention, and the unit can be made portable, leading to lower equipment costs and avoiding the relatively large plant facilities required in prior art equipment and processes.

A higher quality product results from the present invention since inconsistencies in produce prepared by a batch process can result due to the failure to maintain precisely exact conditions of operation from batch to batch, particularly in view of the great deal of artistry found necessary in operating prior art processes.

The device 10 of the present invention is best operated when screens 42 on the periphery of grinding chamber 52 have a spacing relative to the adjacent breaker plates 44 of between 0.015" to 0.250", with a 10–30% opening, thereby requiring 100% of the end product to be able to pass through a 16 mesh screen. Preferably, the peripheral speed of breaker bars 46 is between 188 feet per second and 942 feet per second (57.3 meters per second and 287 meters per second), these speeds relating to the impact pressure generated. Further the impact temperature in grinding chamber 52 at breaker bars 46 is preferably 200° F. to 400° F. (93.3° C. to 204.4° C.) and outer chamber 16 is preferably held between 180° F. and 300° F. (82.2° C. to 148.9° C.). It should be noted that these temperatures can be achieved by introduction of external heat by means of heating elements 60 in thermal contact with breaker plates 44, as well as internal heat produced autogenously by impact of breaker bars 46 on grain.

Cooking and gelatinization take place more quickly for smaller size particles in the elevated temperature, high humidity atmosphere in the grinding chamber. Because of rapid grinding and emission from the grinding chamber, however, the properties of the flour are essentially uniform. Dwell or residence time of the grain in the grinding chamber range from about 2 to 15 seconds, depending upon grain particle size and temperature. An average residence time of the grain in the grinding chamber is generally of the order of about 5 seconds. The ground grain particles have a moisture content of about 5–15%, preferably about 10–15%, and require no additional drying.

When used according to the teachings outlined herein, a desirable product for producing masa harina is obtainable, which is not undercooked due to lack of heat in processing, thereby resulting in a product not having sufficient gelatinization of starches in corn so that a cohesive product cannot be formed into a tortilla. The present invention also leads to a product which is not overcooked, due to overheating of the product, which produces discoloration or oxidation of the point of breaking down cohesive qualities and altering the aroma and taste of the food product ultimately produced. If it were attempted to produce a ground grain product as taught herein, using many of the prior art hammer mill apparatus, this would necessarily result in either an undercooked or overcooked product.

The process and apparatus of the present invention avoid the need for use of substantial quantities of water, large holding tanks, or the expenditure of significant amounts of energy to dry the product. The continuous grinding and cooking process takes place in a very few seconds after initial stabilization of the system, which itself takes place in no more than a few minutes. Once the system has been stabilized by recirculation of warm moist air from the grinding chamber to the outer chamber and back to the grinding chamber, to provide a superheated steam atmosphere, the system can run continuously. An important feature in this respect is that air sealing is provided, in the inlet hopper 12 for the corn and at the air lock 66. (FIG. 3) at the discharge end 29 of the conveyor 26 at the ground product outlet. Air sealing within the apparatus maintains an internal closed circulation path for hot humid air to provide the required superheated steam atmosphere for the efficient continuous cooking of the grain in the grinding chamber. Both absorbed and adsorbed moisture in the grain feed itself aid in creating the humidity in the grinding and cooking chamber, while the humidity level in the ground grain or flour produced by the invention process is brought to the same level as the incoming grain. However, the internal recirculated air and the corn flour product will each saturate with moisture at its own level, and these levels are not necessarily the same.

The corn product thus produced is not only used as masa harina for making tortillas, but is also used for tamales, corn chips, taco shells and the like by direct addition of water to make a cohesive spreadable dough. For some of these the cohesive and spreadable property of a paste made from the flour is not as important as the others, because tamales are simply made as a mixture wrapped within corn leaves, and the corn chip and tortilla chip products are made in various coarsenesses and use different baking and frying techniques. Nevertheless, the grinding/cooking operation of the invention is adapted to provide the traditional type of product that can be hand rolled or machine rolled into a flat tortilla of good quality.

Although the present invention method and apparatus is particularly suited for use with corn as the selected grain in the masa harina process, other whole grains can also be used with adjustment of cooking parameters in response to the characteristics of the desired end product. By varying the cooking parameters, the range of grains and products obtainable can be extended broadly.

EXAMPLE

Corn kernels and powdered calcium hydroxide in approximately the ratio of 12:1 by weight are introduced to infeed 12 and then through grinding chamber inlet 54. The ratio of corn and lime is adjusted so that the pH of the final produce when employing a volumetric ratio of 1:4 of corn and lime, to distilled water will be between pH 11.5 and 14. However, this is merely a preferred range, and the process is operable broadly to produce a product characterized by an even broader range of pH. Calcium hydroxide is added for organoleptic purposes. The corn and calcium hydroxide are ground to a fine powder in grinding chamber 52 by action of breaker bars 46 crushing the corn against breaker plates 44. The finely ground corn and lime are thoroughly mixed in grinding chamber 52 and subjected to moist heat generated autogenously in the chamber, as well as any auxiliary heat needed by heat supplied from heating elements 60. The cooked mixture exits grinding chamber 52 and enters outer chamber 16 through screens 42. The degree of cooking and hydrolysis which takes place in the presence of humidity achieved (about 50% relative humidity) and the temperatures in the grinding chamber (about 121° C.) and the outer chamber (about 93° C.) is normally adequate to produce a corn flour with the desired doughability and flavor characteristics. When the finely ground corn and calcium hydroxide mixture enters outer chamber 16 through screen 42, it does so in the presence of a relatively high velocity air stream generated by a revolving impeller wheel 22 and the attached stirrups 48. The corn and calcium hydroxide pulverized mixture then falls to the bottom of outer chamber 16 for conveying through the air lock 66 at the discharge end 29 and into receptacle 30. The heated moisture laden air stream forming a superheated steam atmosphere, is recirculated through air inlet 59 into grinding chamber 52 and the process continues. The corn flour obtainable has a moisture content of between 5% and 12%, preferably about 10%, and needs no subsequent drying. The path of air followed in its circulating pattern is from air inlet 59 into grinding chamber 52, thence through screens 42 into outer chamber 16, and then back to air inlet 59 covered by the perforated disk 61 (FIG. 6).

The product obtainable is in condition for storage, transport, or immediate use, unlike the product obtainable by the process method of U.S. Pat. No. 3,983,261, issued Sept. 28, 1976 to Mendoza, where there is provided a coaxial conical rotor and stator between which the grain is crushed and by which it is heated by a gaseous medium. This method and apparatus would give a relatively sticky corn so hydrolyzed that it would pass through the apparatus herein described with great difficulty, if at all.

Only with the present invention can both cooking and grain grinding be accomplished in a single continuous process and apparatus without the necessity for steeping, soaking or boiling and without additional drying. In conventional processes it is common to grind twice, first wet grinding the material at elevated temperature, cooling and grinding again. Moreover, with air recirculation, energy savings, and cost savings necessarily result, giving a consistently uniform and high quality cohesive corn product which is neither undercooked nor overcooked.

The foregoing is considered as illustrative only as the principles of the invention, and since numerous modifications and changes will readily occur to those skilled in the art, it is not desired to limit the invention to the exact construction and operation shown and described. Accordingly, all suitable modifications and equivalents may be used as fully within the scope of the invention and the appended claims.

What is claimed is:

1. A method of grinding and cooking whole grain continuously in a grinding chamber separated by a screen from an outer chamber entirely containing the grinding chamber, comprising the following steps:
    (a) introducing whole grain having a moisture content of 10-15% into the grinding chamber while blocking the ingress of air into the grinding chamber;
    (b) impacting and thus crushing the grain in the grinding chamber thereby producing an atmosphere of hot moist air derived from the grain itself and forcing the crushed grain particles to pass along with the hot moist air through the screen into the outer chamber;
    (c) allowing the particles of crushed grain in the outer chamber to fall into the lower portion of the outer chamber;
    (d) recirculating the hot moist air from the outer chamber into the grinding chamber;
    (e) maintaining the temperature and humidity of the recirculating air at a temperature sufficient to cook the grain during its residence in the grinding chamber; and
    (f) removing the collected cooked crushed grain particles from the outer chamber while blocking the ingress of air.

2. The method of claim 1 wherein said whole grain is corn, said grinding chamber permits crushing of said whole corn at an impact pressure obtained by hammers striking a fixed breaker plate at between about 188 feet per second and 942 feet per second (about 57.3 meters per second to 287 meters per second), said grinding chamber having a temperature between about 200° F. to 400° F. (about 93° C. to 204° C.), the outer chamber having a temperature between about 180° F. to 300° F. (about 82° C. to 149° C.).

3. The process of claim 2 wherein the energy required for cooking and grinding of the corn is approximately 0.082 BTUs per pound of crushed final product.

4. The method of preparing a milled flowable granular corn or grain product on a continuous basis without the need for the addition of water or the use of a drying step using a hammer mill grinder exposed to air within an enclosure and comprising the steps of:

maintaining the enclosure at a temperature in the range of 180° to 300° F. (82° C. to 149° C.);

feeding the grain containing natural moisture having a moisture content of 10–15% into the interior grinder while maintaining the grinder temperature in the range of 200° to 400° F. (93° C. to 204° C.);

circulating the air from within the grinder into the enclosure to remove moisture from the ground grain during grinding until a superheated stream atmosphere is established in the grinder and the ground grain of desired fineness is stabilized in moisture content at a level which does not require further drying;

grinding the grain in the grinder to a desired fineness and for an interval sufficient to cook the grain at the established temperature and fineness relationship; and withdrawing the ground grain without substantially introducing unheated or dry air into the enclosure or grinder.

5. The method as defined in claim 4, wherein said enclosure is maintained at a temperature of about 200° F. (93° C.) and said grinder is maintained at a temperature of about 250° F. (121° C.)

6. The method as defined in claim 4, wherein the residence time of the grain in the grinding chamber is in the range from about 2 to 15 seconds.

7. The method as set forth in claim 4 above, wherein the stabilized moisture content of the ground corn is about 10%, wherein the grain is ground to pass an approximately #16 mesh screen and wherein the average residence time in the grinder is of the order of about five seconds.

8. The method as set forth in claim 4 above, further comprising the step of retaining the grain in the grinder at elevated temperature and in the humid atmosphere until sufficiently small to pass into the enclosure such that cooking is effected more quickly as size is reduced.

9. The method as defined in claim 4, including preconditioning said grain by initially treating said grain with heat or moisture to render processing or cooking of the grain more uniform and to reduce overall processing time.

10. The method as defined in claim 4, including the continuous recirculation of hot humid air from the grinder to the enclosure, and back into the grinder and cooking region therein, to maintain said superheated steam atmosphere.

11. The method as defined in claim 4, wherein absorbed and adsorbed moisture in the grain passed into said exterior chamber aids in creating humidity, and the humidity level in the ground grain is brought to a level determined by the moisture in the incoming grain.

12. A method for grinding and cooking whole grain continuously in an apparatus having a grinding chamber, an outer chamber entirely surrounding the grinding chamber and a screen separating the grinding chamber and the outer chamber, which comprises:

(a) introducing the whole grain containing moisture in the range of 10–15% into the grinding chamber without the introduction of exterior air;

(b) impacting the grain in the grinding chamber, thereby grinding the grain to form crushed grain particles and generating heat autogenously by the impacting process in excess of a minimum cooking temperature;

(c) providing additional heating of the outer chamber to the range of 180° F. to 300° F.;

(d) passing air from the outer chamber through said grinding chamber, whereby said autogenously generated heat and said additional heating together with the moisture in th grain provide a super heated stream atmosphere in said grinding chamber;

(e) maintaining said crushed grain particles in said superheated stream atmosphere in said grinding chamber for a sufficient time and at a sufficiently elevated temperature to cook the grain particles in the grinding chamber;

(f) passing the crushed cooked grain particles with said air through the screen into the outer chamber;

(g) allowing the particles of crushed grain to fall into the lower portion of the outer chamber;

(h) recirculating the warm moist air from the outer chamber into the grinding chamber, said warm moist air picking up additional moisture from the grain introduced into the grinding chamber, and maintaining the temperature and humidity to provide said superheated stream atmosphere for said cooking of said grain in said grinding chamber; and (i) removing the collected crushed grain particles from the outer chamber without introducing exterior air; said crushed grain particles having a moisture content of about 5–15%, and requiring no additional drying.

13. The method of claim 12 wherein said whole grain is corn, said grinding chamber permits crushing of said whole corn at an impact pressure obtained by hammers striking a fixed breaker plate at between about 188 feet per second and 942 feet per second (about 57.3 meters per second to 287 meters per second), said grinding chamber having a temperature between about 200° F. to 400° F. (about 93° C. to 204° C.), the outer chamber having a temperature between about 180° F. to 300° F. (about 82° C. to 149° C.).

14. The method of continuously preparing from a grain having a moisture content of 10–15% a milled cooked dry flour product suitable for making into a dough or paste, comprising the steps of:

feeding grain into a grinding chamber having an interior volume that is maintained at a temperature in the range of approximately 240° F. (120° C.);

grinding the grain in the grinding chamber to the desired fineness of an approximately #16 mesh and for an interval of the order of five seconds to cook the grain at the established temperature and fineness relationship;

recirculating air from within the grinding chamber back into the grinding chamber without ingress of unheated or dry air to remove moisture from the ground grain during grinding until a stream atmosphere is established in the grinding chamber and the ground grain of desired fineness is stabilized in moisture content at approximately 10%; and withdrawing the ground grain without substantially introducing unheated dry air into the recirculating air.

15. A method for grinding corn having a moisture content of 10–15% within an enclosure to make a dry corn flour product of the type used in making tortillas and corn chip products, which corn flour product is suitable for direct addition of water to make a cohesive spreadable dough, comprising the steps of:

feeding the corn into a corn grinder within the enclosure without introducing external air;

frictionally grinding the corn within the grinder to a flour of a desired fineness while developing autogenous heat and further providing additional heat input in excess of a minimum cooking temperature to cook said corn and provide hot humid air within the grinder, said enclosure encompassing the corn grinder and grinding chamber and forming an enclosed environment about the grinding chamber;

continuously recirculating hot humid air from the grinder within the enclosure exteriorly of the grinder and back into the grinder and cooking region therein to maintain a superheated steam atmosphere;

discharging ground corn from the grinding chamber into the enclosure around the grinding chamber; and withdrawing flour product from the enclosure while maintaining the enclosure sealed from the external atmosphere, so that a continual stable grinding operation is established to provide a dry flour using the initial moisture of the corn.

16. The method as defined in claim 15, including screening the ground corn product between the grinder and the enclosure around said grinder, and discharging the ground corn product from the grinder.

17. The method as defined in claim 16, including discharging moist humid air from the grinder radially outwardly through said screen sections and recirculating said air from the enclosure around said grinder and returning to said grinder through an opening therein, whereby an air circulation path is established.

18. The method as defined in claim 17, including removal of the flour product from the bottom of the enclosure while blocking the ingress of air to within the enclosure.

19. The method as defined in claim 15, including preconditioning the corn prior to introduction thereof into said enclosure, to provide a flour product having a yellower color and slightly more astringent odor, comprising the steps of:

preparing a slurry of water and calcium hydroxide using only sufficient water to dissolve the calcium hydroxide so that it wets the corn and provides a light coating on the surface of the corn, said coating being obtained by tumbling the corn;

fixing the coating by passing live steam through the corn during said tumbling; and drying the corn at about 150° F. (66° C.) for about 1 hour.

* * * * *

UNITED STATES PATENT AND TRADEMARK OFFICE
CERTIFICATE OF CORRECTION

PATENT NO. : 4,463,022
DATED : July 31, 1984
INVENTOR(S) : Mark H. Sterner and Ronald O. Zane It is certified that error appears in the above-identified patent and that said Letters Patent are hereby corrected as shown below:

Column 1, line 6, after "1980" and before "now", insert a comma (--,--). Column 3, line 9, after "step" insert a period (--.--); line 58, after "is" and before "crushed", "continuorsly" should read --continuously--. Column 7, line 50, after "12" and before the comma (","), "tours" should read --hours--. Column 8, line 66, after "provided" and before "in", strike the comma (","). Column 11, line 27, after "superheated", "stream" should read --steam--. Column 12, line 23, after "heated" and before "atmosphere", "stream" should read --steam--; line 40, after "superheated" and before "atmosphere", "stream" should read --steam--. Column 13, line 4, after "a" and before "atmo-", "stream" should read --steam--.

Signed and Sealed this

Eighth Day of January 1985

[SEAL]

Attest:

Attesting Officer

GERALD J. MOSSINGHOFF

Commissioner of Patents and Trademarks